United States Patent [19]

Heyring

[11] Patent Number: 5,269,556
[45] Date of Patent: Dec. 14, 1993

[54] VEHICLE SUSPENSION INCLUDING FLUID COMMUNICATION CIRCUIT AND ACCUMULATORS

[75] Inventor: Christopher B. Heyring, Dunsborough, Australia

[73] Assignee: Towerhill Holdings Pty. Ltd., Dunsborough, Australia

[21] Appl. No.: 842,188

[22] PCT Filed: Oct. 2, 1990

[86] PCT No.: PCT/AU90/00474
§ 371 Date: May 18, 1992
§ 102(e) Date: May 18, 1992

[87] PCT Pub. No.: WO91/04877
PCT Pub. Date: Apr. 18, 1991

[30] Foreign Application Priority Data

Sep. 29, 1989 [AU] Australia ............... PJ6652
Dec. 1, 1989 [AU] Australia ............... PJ7761
Mar. 26, 1990 [AU] Australia ............... PJ9313
Apr. 3, 1990 [AU] Australia ............... PJ9428

[51] Int. Cl.⁵ .................. B60G 21/067; B60G 21/073
[52] U.S. Cl. .................................. 280/6.12; 280/708; 280/714
[58] Field of Search ............... 280/714, 708, 709, 702, 280/6.12, 6.11

[56] References Cited

U.S. PATENT DOCUMENTS 2,988,372  6/1961  Higginbotham .
3,945,664  3/1976  Hiruma ............... 280/703
4,478,431 10/1984  Muller et al. ............... 280/714
4,586,728  5/1986  Tokunaga et al. ............... 280/703

FOREIGN PATENT DOCUMENTS 1129846  5/1962  Fed. Rep. of Germany ...... 280/708
3427508  2/1986  Fed. Rep. of Germany ...... 280/714
1273466  9/1961  France ............... 280/708
201425  12/1986  France ............... 280/708
363811  12/1931  United Kingdom ............... 280/708
1086556 10/1967  United Kingdom ............... 280/708
1488254 10/1977  United Kingdom ............... 280/708

Primary Examiner—Karin L. Tyson

[57] ABSTRACT

A vehicle having a body 25 supported respective pairs of front and rear wheels, 30, 31, 32, 33, two piston and cylinder units, 23-24, 35-36, 37-38, 34-39, being associated with each wheel and connected between the wheel 30 and body 25 so the piston moves in the cylinders in response to relative movement between the wheel and the body. An individual fluid circuit 40, 41, 42, 43, connecting one piston and cylinder unit 23 of each wheel 30 to a corresponding unit 34 longitudinally spaced therefrom on the same side of the vehicle, and the other piston and cylinder unit 24 of each wheel to a corresponding unit 35 on the transversely opposite side of the vehicle. This arrangement results in the fluid pressure in any two piston and cylinder units interconnected by an individual fluid circuit being equal, and relative movement between any one wheel and the vehicle body induces an opposite relative movement between the vehicle body and the wheel in fluid circuit therewith to maintain tractive ground engagement of all wheels.

19 Claims, 5 Drawing Sheets

VEHICLE SUSPENSION INCLUDING FLUID COMMUNICATION CIRCUIT AND ACCUMULATORS

This invention relates to a suspension system for a vehicle, and is specifically related to controlling the movement of the wheels relative to the vehicle body when traversing uneven surfaces and turning at speed.

In known suspension systems resilient means such as springs or torsion bars are provided to perform a multiplicity of functions ranging from the absorption of impact loading (as from hitting bumps at speed) to the provision of flexible support to enable all the wheels to maintain contact with uneven terrain. Additionally applied loads such as cargo deflects traditional suspensions to induce wheel travel in a similar manner to dynamic or contour loadings.

Traditional resiliently sprung suspensions are based on each wheel assembly being provided with an individual resilient component which mechanically supports the respective "corners" of the vehicle. The resilient components are rapidly progressive and normal vehicle weight is only distributed to each wheel when all the wheels collectively describe a flat plane surface. When a wheel of a vehicle passes over (or is parked on) a bump, this wheel carries more vehiclular weight than it normally carries on flat ground. Meanwhile the other wheels are correspondingly relieved of some of that weight.

These rapidly progressive resiliently sprung suspension systems work satisfactorily only within a very narrow spectrum of dynamic, static and applied loading situations, and any type of overloading or even underloading of a vehicle normally adversely affects its abilities to maintain traction, average ground clearance, and quality of ride. Moreover the scope of demands upon known resilient suspension systems leads to self conflicting performance characteristics as there is no inherent ability in the system to detect and react differently to diverse situations, which cause resonant rebounding, requiring excessive damping with shock absorbers limiting free movement of unsprung weight.

Recently resilient spring suspension systems have begun to incorporate variable damping and spring rates in an attempt to redress some of the shortcomings. Some other more advanced suspension systems (active and semi-active suspensions) incorporate a number of electronic sensors and accelerometers which monitor information such as vertical wheel travel and body roll, as well as speed, steering and braking commands. This and other data is processed by a computer which instructs hydraulic actuators to override the normal function of resilient springs in order to interpret, compensate and adjust the suspensions performance to suit speed, terrain and other factors in order to maintain a level ride and even distribution of weight onto the wheels. These suspension systems therefore need an external intelligent back-up system therefore need an external intelligent back-up system and the actuators require a substantial input of external energy drawn from the vehicle engine.

A range of active and semi-active suspensions for vehicles have been proposed recently including systems operating on the basis of compression and/or displacement of fluids and a limited number of versions of these forms of suspension are already incorporated in production vehicles. However, the systems currently in use employing a liquid and/or gaseous medium usually incorporate a pump to maintain the liquid or gas at the required pressure and distribution, and sophisticated control mechanisms to regulate the operation of the suspension system in accordance with sensed road and/or vehicle operating conditions. These known systems incorporating pumps and electronic control systems, are comparatively expensive to construct and maintain and require energy input, and therefore have limited acceptability in the vehicle industry.

It is therefore the object of the present invention to provide a suspension system which has the advantages of the liquid and/or gas systems, but is considerably simpler in construction and operates more effectively.

With this object in view, there is provided by the present invention a vehicle having a load support body, a pair of front ground engaging wheels and a pair of rear ground engaging wheels connected to the body to support same and each being displaceable relative to the body in a generally vertical direction, means interconnected between each wheel and the body including first and second fluid filled chambers that varies in volume in response to vertical movement between the respective wheel and the body, respective first fluid communicating means connecting said first chambers of the front and rear wheels on the same side of the vehicle to provide respective individual fluid circuit between interconnected chambers, respective second fluid communicating means connecting the second chambers of the front wheels and of the rear wheels respectively to provide respective individual fluid circuits between interconnected chambers, whereby in use the fluid pressure in the two chambers of any individual fluid circuit is substantially the same thereby inducing all wheels to maintain tractive ground engagement.

Conveniently at least one and preferably each of said individual fluid circuits include at least one pressure accumulator means and preferably also a damping means operable to at least partially dissipate pressure shock in the fluid circuit. Under some vehicle operating conditions it can be desirable to reduce or eliminate the operation of one or more of the pressure accumulator means, as further discussed herein, and accordingly means can be provided to selectively restrict or terminate fluid flow to one or more of the pressure accumulatormeans, collectively or individually, from the respective fluid circuits.

Also it is convenient to provide means to selectively vary the rate or terminate fluid flow through one or more of the fluid circuits between the chambers in one or both directions.

The vehicle suspension above described differs greatly from all the known systems in that the wheel travel is not dependent upon progressive resilient suspension mechanisms which require variable reactions to the many ever changing conditions experienced by the vehicle.

In the present proposal all wheels can freely follow even extremely uneven terrain without changing the normal weight distribution onto all wheels, while also maintaining a substantially average vehicle body height and inclination, and without limiting the extent of wheel travel movements. Furthermore there is an unprecedented working interrelationship between wheels which are directly interconnected to each other by the individual fluid circuits and collectively related to the vehicle body so that resilient spring suspension means are only normally used to absorb and dampen dynamic shock, and do not inhibit the translation of wheel travel motions induced by uneven roads or terrain.

A vehicle supported on wheels in the above described manner allows free vertical travel of the individual wheels with respect to the vehicle body or chassis without having to first overcome the resistance of the conventional springing mechanisms normally incorporated between the wheels and the vehicle body. Thus, there is provided a vehicle in which the wheels are individually unrestrained and free to move to follow the undulations of the surface being travelled without continually changing the vehicle weight distribution between the individual wheels. This reduction or elimination of changes in weight distribution significantly improves the traction of the wheels to the surface being traversed and the handling characteristics of the vehicle.

Furthermore, in known suspension systems the springs or like resilient displaceable mechanisms used are intended to both absorb dynamic forces as well as permit non-dynamic wheel travel. However, in the vehicle suspension now proposed, the resilient displaceable mechanisms may be optionally omitted or temporarily deactivated whilst still allowing unrestricted wheel travel in a generally vertically direction, and maintaining constant contact between the wheels and the ground, even when travelling rough terrain.

The invention will be more readily understood from the following description of one practical arrangement of one practical arrangement of the vehicle as illustrated in the accompanying drawings.

Figure 1:
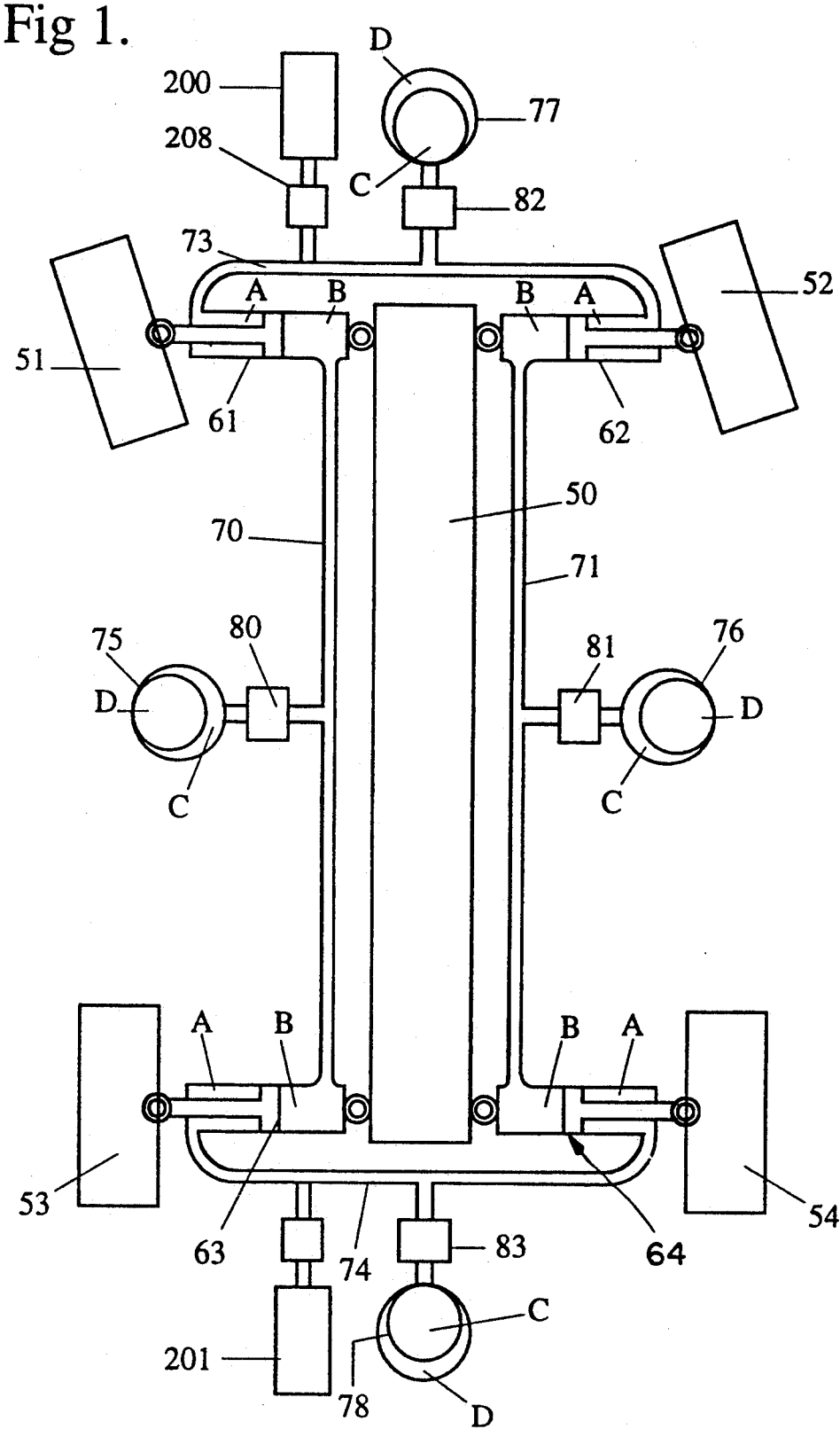
FIG. 1 is a diagrammatic layout of a vehicle suspension.

FIG. 1 shows in a diagrammatic form the basic layout of a vehicle wheel which operates a suspension system in accordance with the present invention. In this drawing the body or chassis of the vehicle is shown diagrammatically at 50 as a rectangular component, however, it is to be understood that the body or chassis can take a wide variety of forms and shapes depending on the particular construction and purpose of the vehicle. The body 50 is supported by four wheels comprising two front steerable wheels 51 and 52 and two rear non-steerable wheels 53 and 54. It is to be understood that the vehicle may also have all four wheels either steerable or non-steerable, or the front wheels either steerable or non-steerable, or the front wheels may be fixed and the rear wheels steerable, depending upon the particular requirements of any vehicle. Four double acting hydraulic cylinders or rams of basically conventional construction are provided identified as 61, 62, 63 and 64. Each cylinder is pivotally connected to a respective wheel at one end and to the body 50 at the other end so that it may pivot relative to the wheel and body about respective parallel axes extending generally in the longitudinal direction of the vehicle body. It is to be understood that additional components will be provided to connect the respective wheels to the vehicle body which will pivot relative to the wheel and body about axes parallel to the pivot axes of the cylinders, however, such additional members have been omitted from the drawing for the sake of clarity.

Each of the double acting cylinders 61, 62, 63 and 64 are of conventional construction having an outer housing with a cylindrical bore therein and a piston mounted in the bore with a piston rod coupled to the piston and extending through one end of the cylinder. A suitable seal is provided between the piston rod and the end of the cylinder through which it projects so that there is provided on each side of the piston a fluid tight chamber with the volume of each chamber varying in response to movement of the piston in the cylinder. For the sake of convenience the chamber at the piston rod end of the cylinder shall be identified as chamber A and that at the opposite end of the cylinder, that is, above the piston, will be identified as chamber B. Thus in respect of cylinder 61, the piston rod end chamber shall hereinafter be referred to as chamber 61A and the chamber above the piston will be referred to as chamber 61B. The corresponding chambers in the other cylinders 62, 63 and 64 will be similarly identified.

The chambers 61B and 63B are interconnected by a fluid line 70 and the chambers 62B and 64B are interconnected by a fluid line 71. Similarly chamber 61A is connected to chamber 62A by the fluid line 73 and chamber 63A and 64A are connected by line 74.

It is therefore seen that the respective chambers A of each wheel is in direct fluid communication with its corresponding chamber A associated with the wheel on the transversely opposite side of the vehicle, and the respective chambers B of each wheel are in direct communication with the corresponding chambers B of the wheel at the opposite longitudinal end and on the same side of the vehicle. It will also be noted that the chambers at the piston rod end of the cylinders are connected to the corresponding cylinder at the other wheel and the chamber above the piston is connected to the corresponding chamber on the other wheel. Thus it will be appreciated that any variation in the capacity of chamber A and B of the double acting cylinder associated with one wheel will displace corresponding quantities of fluid from one double acting cylinder to the other two double acting cylinders connected thereto by the fluid lines.

It will be understood that although the layout in FIG. 1 employs a single double acting cylinder connected between each wheel and the vehicle chassis 50, the same operational result could be achieved by providing two single acting cylinders connecting each wheel to the vehicle chassis, with the transverse fluid lines 73 and 74 connecting one cylinder of each wheel to the corresponding cylinder on the transversely opposite wheel and the longitudinal fluid lines 70 and 71 connecting the other cylinder from each wheel to the corresponding cylinder of the longitudinally spaced wheel on the same side of the vehicle.

With the cylinders arranged between the wheels and the vehicle chassis and interconnected as above described by fluid lines, a vehicle suspension system is created whereby relative movement in a vertical direction between any one wheel and the chassis 50 will result in a corresponding opposite movement between the transversely opposite wheel and the vehicle, and a corresponding movement between the longitudinally spaced wheel and the vehicle on a corresponding same side of the vehicle. Expressed another way, vertical movement between a wheel and the vehicle chassis in one direction, results in a similar vertical movement between the diagonally opposite wheel and the chassis while the other two wheels will move in the opposite direction by a corresponding amount.

The result of this configuration of movements is that the vehicle chassis 50 will remain substantially level although its average height with respect to a selected ground datum may vary while all wheels remain in ground contact. It is also most important to note that in view of the interconnection by the respective hydraulic lines of the four cylinders 61, 62, 63 and 64, the pressures in the interconnected chamber of the four double acting cylinders will be substantially the same. Thus the weight transferred from the chassis through the cylinders to each of the wheels will be substantially the same, whereby all of the wheels will remain in effective tractive engagement with the surface upon which the vehicle is supported or moving over.

Each of the fluid lines 70, 71, 73 and 74 are in communication with respective hydraulic accumulators 75, 76, 77 and 200, and 78 and 201 with a control or damping valve 80, 81, 82 and 208, and 83 and 209, interposed between the respective fluid line and accumulators. Each accumulator is divided in the known manner into two chambers by a movable internal wall. For convenience the chambers are designated C and D in each accumulator, compartment C being in communication with the respective fluid line and compartment D containing a compressed gas. The hydraulic accumulators 75, 76, 77 and 78 as illustrated are the common flexible diaphragm type, however, accumulators of other constructions may be used, including piston type, and accumulators using springs or other resilient mechanisms as a substitute for the compressed gas compartment. The accumulators 200 and 201 are of a specific construction that will be described in detail hereinafter.

When the valves 80, 81, 82, 83, 208 and 209 are open, the accumulators perform the primary function of providing a degree of resilience in the suspension systems as during upward movement of any one wheel part of the displaced fluid in the associated cylinder can enter or leave the chamber C of the accumulator thus changing the amount of fluid transferred to the interconnected cylinder and also compressing the gas in the chamber D, thereby increasing the pressure of the fluid in the fluid line interconnecting the two cylinders and hence also increasing the pressure in the respective cylinder. When the vehicle is travelling in a generally straight line on an even surface, each of the control valves will normally be in an open position so as to provide a high level of resilience in the suspension system to thereby accommodate minor irregularities that may be encountered in the road surface with minimum vehicle body movement.

It will be noted that in the arrangement shown in FIG. 1, the fluid in lines 73 and 74 will normally be subjected to a below or sub-atmospheric pressure or suction when the vehicle is stationary or being supported normally on its wheels. It is therefore preferable to include specially constructed accumulators to operate with sub-atmospheric pressure in the lines, and which provide progressive resilience to increasing sub-atmospheric pressures. Accumulators 200 and 201 included in fluid lines 73 and 74 respectively are of this construction. These accumulators may be of any known construction and one preferred construction is shown in FIG. 5.

Figure 5:
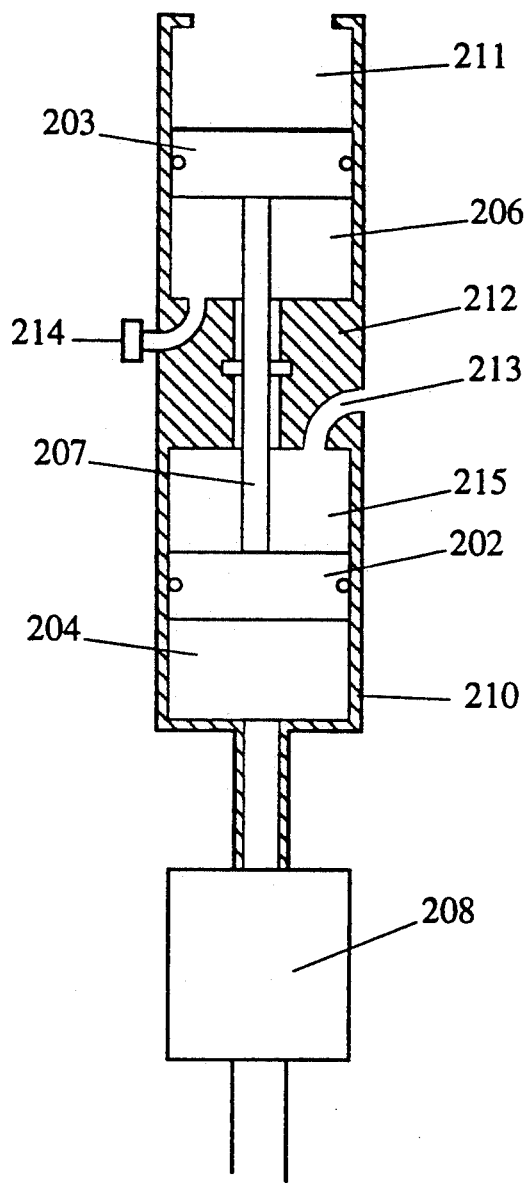
FIG. 5 is a sectional view of the one construction of accumulator as used with double acting piston/cylinder units as referred to in relation to FIG. 1.

Referring now to FIG. 5, the accumulator comprises a rigid houding 210 with a cylindrical bore 211 and a dividing wall 212. The piston rod 207 extends through the wall 212 in sealed sliding relation and rigidly interconnects the pistons 202 and 203 each in sealed sliding engagement with the bore 211. The pistons form with dividing wall 212, the chamber 215 which is vented to atmospheric by passage 213, and the chamber 206 which is charged with a gas under pressure. The charging port 214 is provided for connecting to a suitable gas recharging facility.

The piston 202 forms with the housing 210 the chamber 204 which in use is in communication with one of the fluid lines 73 or 74 via the control valve 208 or 209 as previously referred to.

In operation when the control valve is open and the sub-stmospheric pressure increases in the fluid line connected to the accumulator the piston 202 is drawn downwardly in the chamber 204 as viewed in FIG. 5. This causes the piston 203 to also move downwardly in the chamber 206 thereby compressing further the gas in chamber 206, until a balance is achieved between chambers 204 and 206, thus providing resilience to the suspension system.

Under dynamic loading situations or when the wheels may be temporarily relieved of the vehicle weight the accumulators 77 and 78 provide the resilience to downward motions of the wheels relative to the body or chassis 50. The progressive shut-off valves 82 and 83, therefore, are normally open when the lines 73 and 74 are positively pressurized and closed when the lines are subject to sub-atmospheric pressures or in suction, while the shut-off valves 208 and 209 are normally open as the associated lines are usually at sub-atmospheric pressure in most operating conditions.

In many circumstances accumulators 77 and 78 along with their valves 82 and 83 may be totally omitted, as when known rubber stops are incorporated in the wheel assemblies to prevent bottoming out. It should be understood that although the drawings show the transverse lines 73 and 74 as being associated with the accumulators of the construction shown in FIG. 5 and the chambers "A" of the piston/cylinders units, the lines between chamber "A" may equally well be located longitudinally of the vehicle between cylinders 61, 63, and 62, 64 respectively while the lines between chambers B may be located transversely between chambers of cylinders 61, 62, 63 and 64.

In the case of this latter arrangement the accumulators 200 and 201 would be in communication with longitudinal lines 70 and 71 and will in this configuration provide roll control of the vehicle instead of pitch control and resilience as shown in FIG. 1 as well as assisting with maintaining vehicle height above ground.

When the vehicle is turning, particularly at a speed when significant centrifugal forces are generated, the accumulator connected to the fluid line between the front and rear wheels on the outer side of the turning circle is preferably isolated by closing the control valve associated therewith, whilst the accumulators on the opposite side of the vehicle and at the front and rear remain connected to the respective fluid lines. Thus as shown in FIG. 1 when the vehicle is turning to the left, the valve 81 would be closed to isolate the accumulator 76 from the fluid line 71 and the remaining valves 80, 82 and 83 remain open.

Under braking conditions, when there is a high dynamic load placed on the front wheels, the valve 208, as seen in FIG. 1, would be closed to isolate the fluid line 73 from the accumulator 200, thus preventing dipping of the front of the vehicle. Similarly under acceleration when a dynamic load is placed on the rear wheels, the valve 209 would be closed to prevent dipping of the rear of the vehicle. Closing of any such valve does not restrict normal articulation movement.

Suitable sensors can be provided on the vehicle to detect turning, braking and acceleration, and the signals from these sensors are processed through an ECU (electronic control unit) which controls the operation of the valves 80, 81, 82 and 208, and 83 and 209. These valves can be solenoid operated, preferably of a construction that permits the valves to be opened to varying degrees to regulate the rate of flow of fluid into and out of the accumulators. Thus the solenoid valves may in addition to being opened and closed, may be set at any intermediate position to control the rate of flow of fluid into and out of the accumulators thus functioning as a variable damper.

It is to be understood that multiple accumulators may be provided in communication with each of the fluid lines 70, 71, 73 and 74 with the respective accumulators on any one fluid line having an independent solenoid valve controlling the communication between the accumulator and the fluid line. Further, where more than one accumulator is provided in each fluid line, the nominal pressure rating of each accumulator may be different such that when the vehicle is operating under light loads a lower pressure accumulator is used than when it is operating under high loads.

Figure 4:
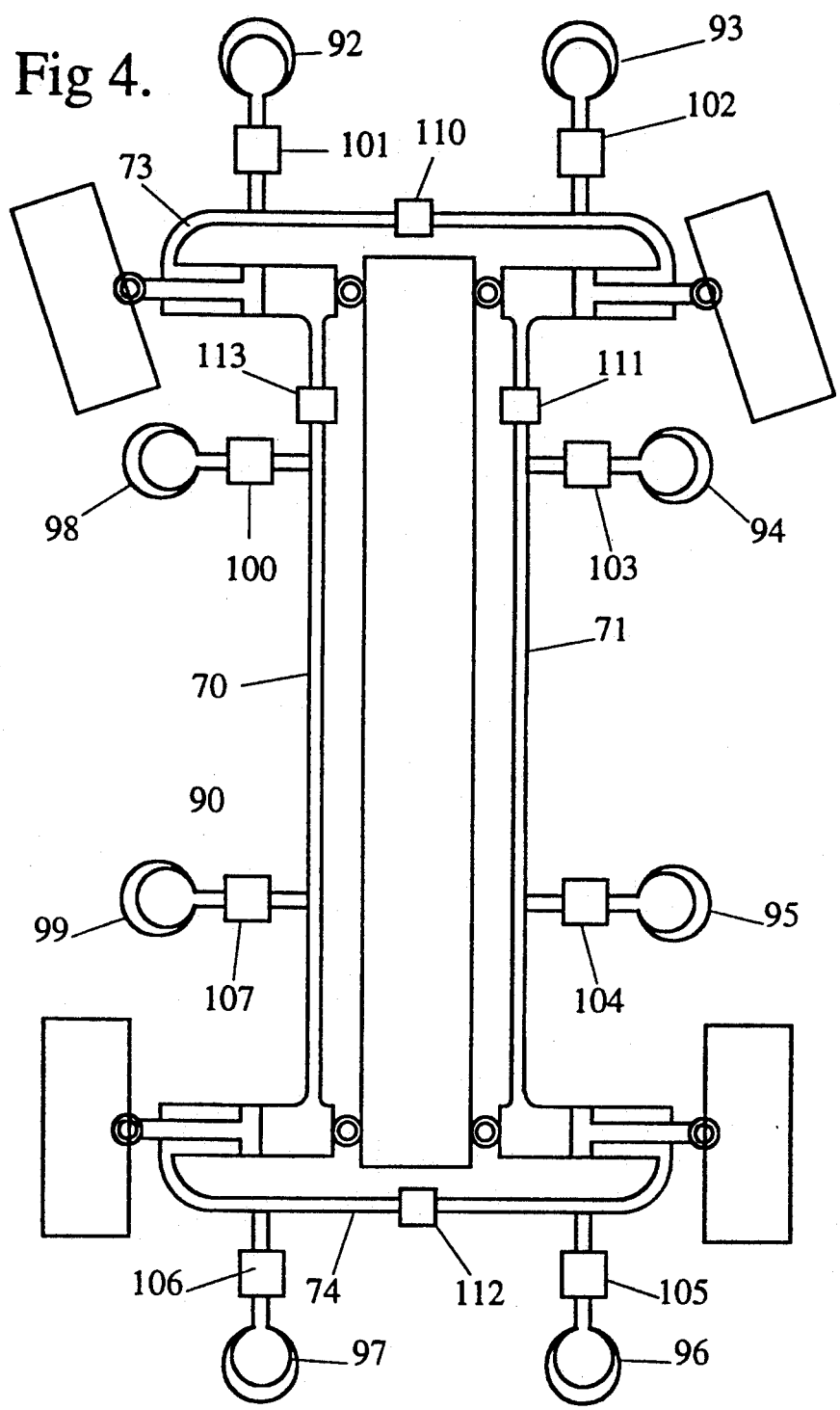
FIG. 4 is a diagrammatic layout similar to FIG. 1 of a modification to the suspension system.

Also when cornering, such as to the left in FIG. 4, the low pressure accumulator on the outer side of the vehicle (fluid line 71 in FIG. 1) is isolated and the high pressure accumulator on the inner side (fluid line 70 in FIG. 1) is isolated to minimize outward roll of the vehicle.

Figure 2:
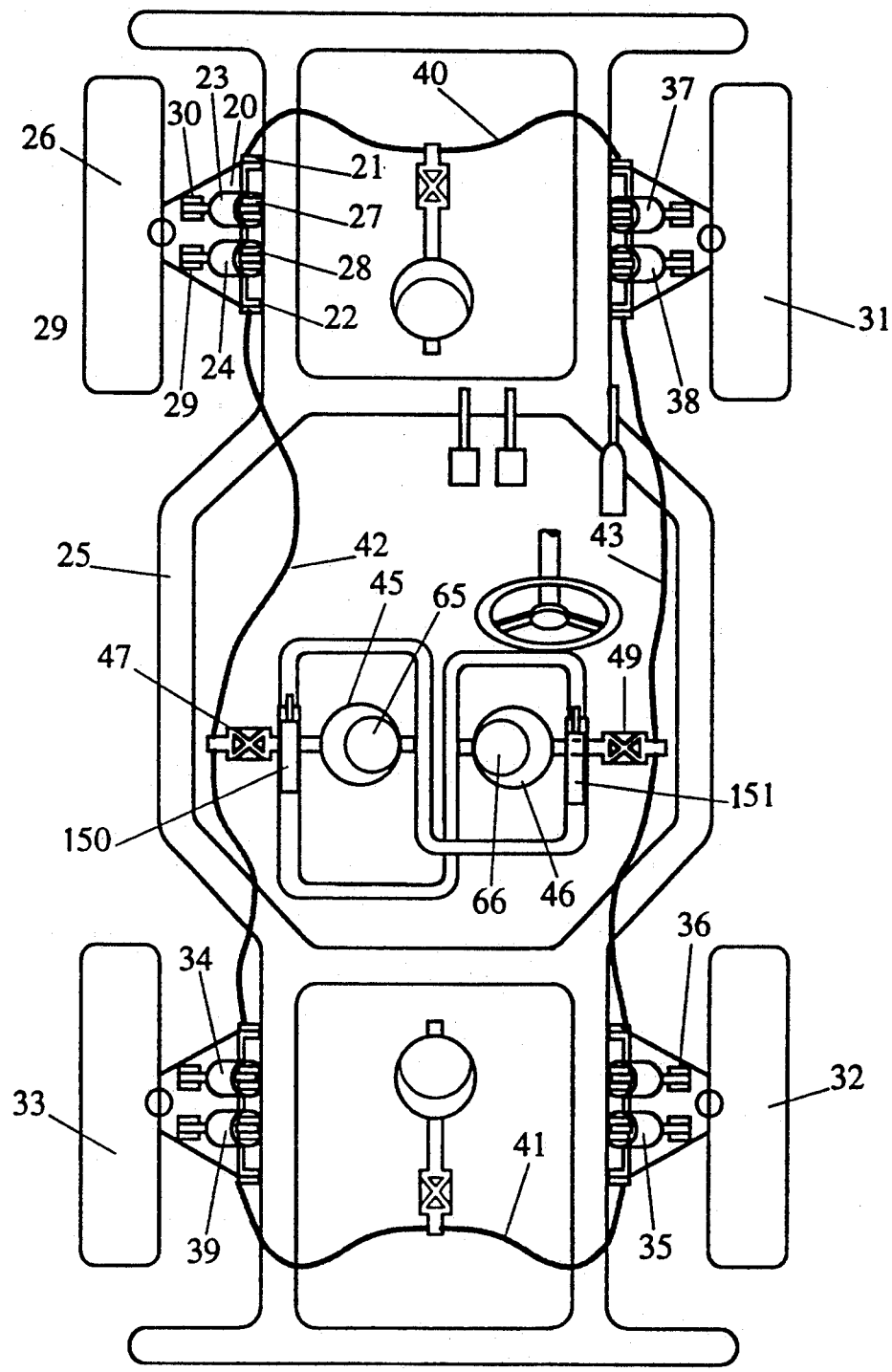
FIG. 2 is a schematic plan view of a vehicle incorporating the suspension system.

FIG. 2 of the drawings illustrates an alternative form of the suspension system to that shown diagrammatically in FIG. 1. In FIG. 2, the vehicle chassis is shown in a more realistic form but is still to be considered as fundamentally diagrammatic. In this drawing, each of the wheels, such as the wheel 26, is connected to the chassis by a wishbone type arm 20 which is pivotally connected to the chassis 25 by respective co-axial pivot connections 21 and 22. Further, the single double acting cylinders or rams, as described with respect to FIG. 1, connected between the vehicle chassis and the respective wheels, have each been replaced by two single acting cylinders 23 and 24, each pivotally connected to the chassis 25 at 27 and 28 and to the arm 20 at 29 and 30. The pivot connections at the respective ends of the cylinders 23 and 24 are aligned in the generally longitudinal direction of the chassis 25 whereby as the wheel 30 and the arm 20 carrying the wheel pivot relative to the chassis 25, each of the cylinders 23 and 24 expand or retract.

The above description with respect to the mounting of the wheel 26 and the interacting pair of cylinders 23 and 24 also applies to the connection of each of the other three wheels 31, 32 and 33 of the vehicle, however, for the sake of clarity individual reference numerals for the corresponding components are not shown for each wheel mounting although the respective cylinders on each wheel have been individually identified.

The cylinders 23 and 37 interacting respectively with the front wheels 26 and 31 of the vehicle are interconnected by the fluid line 40 whilst the cylinders 39 and 35 associated with rear wheels 32 and 33 are interconnected by the fluid line 41. Similarly the cylinders 24 and 34 associated with the front and rear wheels 26 and 33 respectively, are interconnected by the fluid line 42, whilst the front and rear wheels 31 and 32 on the opposite side of the vehicle are interconnected by the fluid line 43. Thus the operation of the respective pairs of single acting cylinders associated with each wheel produce the identical effect in relation to the relative movement between the respective wheels of the vehicle and the vehicle chassis as has previously been described with respect to FIG. 1 wherein a single double acting cylinder is provided between each wheel and the vehicle chassis.

The front and rear fluid lines 40 and 41 are in communication with respective accumulators via individual damping valves as has previously been described with respect to FIG. 1, however, the accumulators 45 and 46, connected respectively to the fluid lines 42 and 43, as shown in FIG. 2 are provided with automatic damping or control valves 150 and 151 in addition to damper valves 47 and 49 which functionally correspond to damper valves 80 and 81 in FIG. 1.

Figure 3:
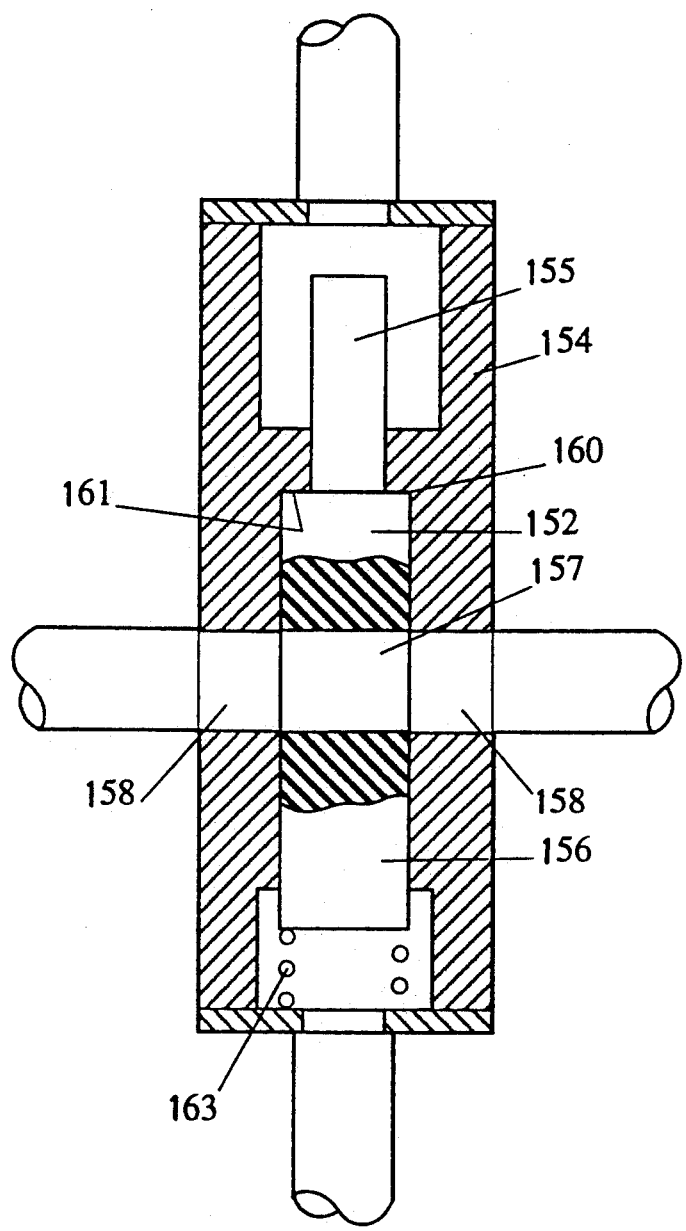
FIG. 3 is a schematic sectional view of suspension means and control unit used in the suspension system.

The automatic damper valves 150 and 151 are of identical construction and each comprises a shuttle 152 shown in more detail in FIG. 3 axially slidable in a housing 154. The shuttle is of a stepped piston form having a small end 155 and a large end 156 with a transverse passage 157 through the large end 156. The housing 154 also has a transverse passage 158 which in use communicates with the accumulator 45 on one side and the damping valve 47 on the other side. When the passages 152 and 158 in the shuttle and housing respectively are in alignment, there is free passage for fluid to pass between the damping valve 47 and the accumulator 45 whilst axial displacement of the shuttle 152 in the housing 154 in a downward direction as seen in FIG. 3 will progressively restrict the flow passage between the damping valve 47 and the accumulator 45.

The shuttle 152 and housing 154 are provided with respective shoulders 160 and 161 arranged so that when the shoulder 61 of the shuttle engages the shoulder 161 of the housing, the transverse passage 157 in the shuttle will be in direct alignment with the transverse passage 158 of the housing so as to not restrict the flow through the passage 158. However, as the shuttle 152 is displaced from that position, the transverse passage 158 in the housing 154 will be progressively reduced in the cross-sectional area thereby restricting the fluid flow to and from the accumulator 45.

As can be seen in FIGS. 2 and 3, the small end 155 of the shuttle 152 is subjected to the pressure in the compressible chamber 65 of the accumulator 45 and the large end 156 of the shuttle 152 is subjected to the pressure in the compressible chamber 66 of the accumulator 46. Thus, when the pressures in the chambers 65 and 66 are equal, the shuttle 152 will be moved upwardly as seen in FIG. 3 so that the shoulders 160 and 161 will abut and therefore the shuttle would offer no restriction of the flow between the damper valve 47 and the accumulator 45. However, when the pressure difference between the chambers 65 and 66 is such that the force applied to the small end 155 of the shuttle 152 is greater than the force applied to the large end 156 of the shuttle 152, then the shuttle will commence to move downwardly as seen in FIG. 3, thereby introducing a restriction to the flow of fluid into or out of the accumulator 45.

Under normal operating conditions when the pressure differential between the accumulators 45 and 46 as a result of normal irregularities in the surface being the pressure differentive will not be sufficient to cause the shuttle 153 to be displaced and thus it will not generate a restriction to the flow of fluid to or from the accumulator. However, under more severe conditions, such as when the vehicle is turning and there is a substantial centrifugal force component applied to the vehicle wheels on the outer side of the turn, a sufficient pressure difference will be developed between the accumulators 45 and 46 to close the passage 158 in the housing of the automatic damper valve on the outside of the vehicle whilst that on the inside of the vehicle will remain open. A spring, such as indicated at 163 in FIG. 3 may be provided so as to achieve a progressive movement of the shuttle as the pressure differential increases thereby obtaining a progressive opening and closing of the passage 158.

FIG. 4 is a diagrammatic layout similar to that shown in FIG. 1 and like components in FIG. 4 have been given the same reference numerals as in FIG. 1. In the construction shown in FIG. 4 there are two accumulators provided in each of the fluid lines 70, 71, 73 and 74 identified as 90, 91, 94, 95, 92, 93, 96 and 97 respectively with the respective accumulators in each line having different nominal pressures. That is, in respect of line 70 the accumulator 91 has a higher pressure in the gas cavity 98 than in the gas cavity 99 in the accumulator 90. Each of the accumulators is provided with a respective control valve numbered 100 to 107 which are solenoid or otherwise operated so that either one or both of the accumulators associated with each line may be in active communication with that fluid line. Thus by way of example, as the accumulator 90 has a lower nominal operating pressure than accumulator 91, when the vehicle is operating in conditions requiring heavier springing the accumulator 91 would be in communication with the fluid line 70 and the accumulator 90 isolated from the fluid line 70. Under light springing requirement both accumulators may be in communication with the fluid line as accumulator 91 having the high operating pressure will not function. The respective accumulators in each of the other fluid lines would be similarly operated.

There is also provided in the configuration shown in FIG. 4 a shut-off valve in each of the fluid lines, these shut off valves being designated by the reference numerals 110 to 113, respectively. When the shut-off valves are closed, it will be appreciated that there will be no transfer of fluid or pressure from the cylinder associated with one wheels to the cylinder of the wheel transversely and longitudinally spaced therefrom. However, there will still be a degree of springing available through the respective accumulators where at least one accumulator will be in communication with each end of each cylinder.

The advantage of providing the shut-off valves is that under high speed conditions when the vehicle is cornering it is desirable to limit the amount of movement between the front wheels and the chassis and to a lesser extent between the rear wheels and the chassis.

Thus, when the vehicle is turning to the left as shown in FIG. 4, shut-off valves 110 and 111 will be closed, thus resisting the downward movement of the chassis relative to the wheel 52 arising from the centrifugal forces developed during cornering. Also it would be preferable for the low pressure accumulators 95 on the outer side of the vehicle, to be isolated from the fluid line 71, thus also restricting the movement of the body relative to the rear wheel 54 on the outer side of the vehicle. Under the most severe cornering conditions at very high speed, it would be preferable to also close shut-off valve 112 and isolate the accumulator 96 from the fluid line 74.

It will be appreciated that with the provision of the shut-off valves as above discussed, and also valves between the respective accumulators and fluid lines, a high degree of control and variation in the performance of the suspension system can be achieved particularly where the respective accumulators coupled to each fluid line have different load ratings, and those accumulators can be selectively coupled or de-coupled from the fluid line. Further, the control valves may be of a variable nature to provide a variable degree of damping between the respective accumulators and the fluid lines.

Where the suspension system includes a range of controls to vary the performance characteristics of the suspension as referred to above and elsewhere in this specification, it is convenient to provide an electronic control unit (ECU) and a plurality of sensors to provide input to the ECU which in turn will control the operation of the various valves, accumulators and dampers in the system to adjust the suspension system to meet different vehicle operating conditions. In particular, as referred to elsewhere in this specification, the characteristics of the suspension system can be varied in response to acceleration, braking and turning of the vehicle, and appropriate sensors for detecting such operational conditions of the vehicle are known and used in other suspension systems. Accordingly, details of such sensors and the interaction thereof with ECUs shall not be described in further detail herein.

It is also to be understood that fixed or variable restrictors may be provided in the fluid lines to control the rate of fluid movement through the lines between respective interconnected cylinders. A fixed restriction may be achieved by variation in the bore of the fluid line at one or more locations along its length. Also if the fluid used in the system was an electro rheological fluid, then an appropriate magnetic field generating device could be located on or in the fluid lines so that the rate of fluid flow through those lines could be controlled by varying the strength of the magnetic field.

In reference to FIGS. 2 and 3, the automatic damping valves 150 and 151 are interconnected with the fluid lines running longitudinally of the vehicle and intercommunicating the cylinders of the front and rear axles. However, it is to be understood that the same automatic damping system can be incorporated between the front and rear transverse fluid lines such as fluid lines 40 and 41 in FIG. 2 so as to operate in a like manner as described with respect to automatic dampers 150 and 151. Also, in the one suspension system, such automatic dampers may be provided both between the longitudinal fluid lines and the transverse fluid lines.

It is also envisaged that a pump may be provided which may be selectively operated to transfer fluid from one side fluid line to the other, or alternatively from the front to the rear fluid lines and vice versa. Preferably a single pump may be used with a suitable switchable porting arrangement to connect the appropriate fluid lines to the pump. By transferring fluid between the front and rear fluid lines, there is provided a control over the pitch trim of the vehicle whilst transferring fluid between the respective side fluid lines to adjust the roll of the vehicle.

Also, the pump can be arranged so that it can be coupled to a fluid reservoir so that more or less fluid may be provided in the fluid lines thereby raising or lowering the nominal height of the vehicle body. It is, however, to be understood that the provision of a pump to carry out the above operations is not essential to the operation of the suspension system, but merely provides additional capabilities of the system which may be used in connection with specific operating conditions of the vehicle.

Although the invention has been described herein with reference to a two-axle vehicle, it will be readily appreciated that it may be applied to a vehicle having multiple axles such as commonly referred to as tandem axle assemblies. In a vehicle having a tandem wheel assembly each wheel of the assembly is provided with two cylinders or a single double acting cylinder as previously described with reference to FIGS. 1 or 2. One cylinder of each assembly is connected to a common fluid line extending longitudinally of the vehicle, one on each side of the vehicle. The other cylinder of each wheel is connected by an independent fluid line to the corresponding cylinder on the transversely opposite wheel.

Also it is to be understood that although not shown in the drawings a conventional resilient suspension element can be provided, such as a spring or torsion bar, connected between each wheel and the chassis. Where such a resilient suspension element is used it is preferably designed to support only the static weight of the suspended portion of the vehicle or a major portion thereof, the dynamic loading being accommodated by the fluid suspension hereinbefore described. Further it is to be understood that although the suspension system has been herein described with reference to an hydraulic fluid being used in the cylinders and fluid lines, the system is equally operable with air or other gas as a substitute for the hydraulic fluid.

The claims defining the invention are as follows:

1. A vehicle having a load support body, a pair of front ground engaging wheels and a pair of rear ground engaging wheels connected to the body to support same and each being displacable relative to the body in a generally vertical direction, means interconnected between each wheel and the body including first and second fluid filled chambers that varies in volume in response to vertical movement between the respective wheel and the body, respective first fluid communicating means connecting said first chambers of the front and rear wheels on the same side of the vehicle to provide respective individual fluid circuit between interconnected chambers, respective second fluid communicating means connecting the second chambers of the front wheels and of the rear wheels respectively to provide respective individual fluid circuits between interconnected chambers, whereby in use the fluid pressure in the two chambers of any individual fluid circuit is substantially the same thereby inducing all wheels to maintain tractive ground engagement, at least said two second fluid communicating means each including respective main pressure accumulator means, and control means operable in response to a selected vehicle operating condition to vary the rate of flow of fluid to the respective main pressure accumulator means of at least the second fluid communicating means, said control means including a valve operable in response to the pressure differential between the two second fluid communication means, said valve being arranged to reduce the rate of flow of fluid to the main pressure accumulator of one second fluid communicating means in response to the pressure in that one second fluid communicating means being greater than the pressure in the other second communicating means by a predetermined amount.

2. A vehicle as claimed in claim 1 wherein the control means operable to vary the flow rate to the main pressure accumulator means included in said two second fluid communicating means are operable to selectively prevent flow of fluid to any one of the main pressure accumulator means.

3. A vehicle as claimed in claim 2, wherein said control means is operable in response to braking of the vehicle to prevent flow of fluid to the main pressure accumulator means communicated with the second fluid communicating means interconnecting the second chambers of the front wheels of the vehicle.

4. A vehicle as claimed in claim 2 wherein said control means is operable in response to acceleration of the vehicle to prevent flow of fluid to the main pressure accumulator means communicated with the second fluid communicating means interconnecting the second chambers of the rear wheels of the vehicle.

5. A vehicle as claimed in claim 1 wherein said second fluid communicating means each include a further pressure accumulator means.

6. A vehicle as claimed in claim 5, wherein said further pressure accumulator means are operable at different pressure than that of the main pressure accumulator means of the second fluid communicating means.

7. A vehicle as claimed in claim 5, wherein further control means are provided operable in response to a selected vehicle operating condition to vary the rate of flow of fluid to the respective further pressure accumulator means of at least the second fluid communicating means.

8. A vehicle as claimed in claim 1, wherein said two first fluid communicating means also each include a respective main pressure accumulator means.

9. A vehicle as claimed in claim 8 wherein the control means are operable to also selectively prevent flow of fluid to any of the main pressure accumulator means included in said first fluid communicating means.

10. A vehicle as claimed in claim 8, wherein said control means is operable in response to turning of the vehicle to prevent flow of fluid to the main pressure accumulator means communicating with the first fluid communicating means connecting the first chambers of the front and rear wheels on the outer side of the vehicle with respect to the direction of turning.

11. A vehicle as claimed in claim 8, wherein at least said first fluid communicating means each include respective further pressure accumulator means.

12. A vehicle as claimed in claim 11, wherein said further pressure accumulator means are operable at different pressures than that the main pressure accumulator means of the first fluid communicating means.

13. A vehicle as claimed in claim 11, wherein further control means are provided operable in response to a selected vehicle operating condition to vary the rate of flow of fluid to the respective further pressure accumulator means of at least the first fluid communicating means.

14. A vehicle as claimed in claim 1 including damping means operably interposed between each main pressure accumulator means and the remainder of the fluid communicating means to vary the rate of flow to that main pressure accumulator means.

15. A vehicle as claimed in claim 5, including damping means operably interposed between each further pressure accumulator means and the remainder of the fluid communicating means to vary the rate of flow to that further pressure accumulator means.

16. A vehicle as claimed in claim 1 wherein at least one fluid circuit includes means operable to selectively control the rate of flow of fluid between the chambers in that fluid circuit.

17. A vehicle as claimed in claim 1, wherein said valve is arranged to terminate the flow of fluid to main pressure accumulator of said one fluid communicating means when the pressure in said one fluid communicating means is greater than the other by a predetermined maximum amount.

18. A vehicle as claimed in claim 9, wherein the control means include valve means operable in response to the pressure differential between the two first fluid communication means, said valve means being arranged to reduce the rate of flow of fluid to the main pressure accumulator means of one first fluid communicating means in response to the pressure in that one first fluid communicating means being greater than the pressure in the other first communicating means by a predetermined amount.

19. A vehicle as claimed in claim 18, wherein said valve means is arranged to terminate the flow of fluid to the main pressure accumulator means of said one first fluid communicating means when the pressure in said one first fluid communicating means is greater than that of the other, by a predetermined maximum amount.

* * * * *